US005695223A

United States Patent [19]
Boticki

[11] Patent Number: 5,695,223
[45] Date of Patent: Dec. 9, 1997

[54] QUICK-DISCONNECT TUBE COUPLER WITH USE-ENHANCING FEATURES

[75] Inventor: John A. Boticki, Racine, Wis.

[73] Assignee: Fred Knapp Engraving Co., Inc., Racine, Wis.

[21] Appl. No.: 413,099

[22] Filed: Mar. 29, 1995

[51] Int. Cl.$^6$ .................................................. F16L 55/00
[52] U.S. Cl. ........................... 285/23; 285/81; 285/305
[58] Field of Search ........................... 285/23, 305, 307, 285/381, 81, 308, 310, 381.4

[56] References Cited

U.S. PATENT DOCUMENTS

| | | |
|---|---|---|
| 2,049,801 | 5/1936 | Gage ........................... 285/305 X |
| 4,076,279 | 2/1978 | Klotz et al. ..................... 285/305 X |
| 4,436,125 | 3/1984 | Blenkush . |
| 4,453,747 | 6/1984 | Bimba . |
| 4,541,457 | 9/1985 | Blenkush . |
| 4,570,980 | 2/1986 | Goward . |
| 4,616,859 | 10/1986 | Brunet ........................... 285/317 |
| 4,632,436 | 12/1986 | Kimura . |
| 4,641,859 | 2/1987 | Walters ........................ 285/317 X |
| 4,700,926 | 10/1987 | Hansen . |
| 4,759,572 | 7/1988 | Richardson . |
| 4,874,174 | 10/1989 | Kojima et al. . |
| 4,934,655 | 6/1990 | Blenkush et al. . |
| 4,936,544 | 6/1990 | Bartholomew . |
| 5,000,614 | 3/1991 | Walker et al. . |
| 5,016,922 | 5/1991 | Le Mer et al. . |
| 5,040,831 | 8/1991 | Lewis . |
| 5,052,725 | 10/1991 | Meyer et al. . |
| 5,074,601 | 12/1991 | Spors . |
| 5,090,747 | 2/1992 | Kotake . |
| 5,104,158 | 4/1992 | Meyer et al. . |
| 5,152,555 | 10/1992 | Szabo . |
| 5,217,260 | 6/1993 | Boticki . |
| 5,405,175 | 4/1995 | Bonnah, II et al. .............. 285/921 X |

FOREIGN PATENT DOCUMENTS 1253981  11/1971  United Kingdom .................. 285/305

Primary Examiner—Terry Lee Melius
Assistant Examiner—Heather Schackelford
Attorney, Agent, or Firm—Jansson & Shupe, Ltd.

[57] ABSTRACT

The disclosed bifurcated (fork-like) device is for use in a tube coupler to hold male and female members in sealing contact with one another. Each rail of the device has a laterally-outwardly-extending "hook-like" projection. When used in a coupler, such projections engage retention shoulders to retain the device on the coupler. Guide members help urge the projections toward such shoulders. A related tube coupler has a locking mechanism which is biased toward and automatically engages the device when such device is pushed into the de-coupling position. The coupler also has a trip surface which urges the mechanism to its unlatch position when the male member and the female member are moved to sealing contact with one another. Unlatching the mechanism permits the device to return to its coupling position.

10 Claims, 4 Drawing Sheets

QUICK-DISCONNECT TUBE COUPLER WITH USE-ENHANCING FEATURES

FIELD OF THE INVENTION

This invention relates generally to pipe joints or couplings and, more particularly, to couplings for quickly connecting and disconnecting pieces of tubing.

BACKGROUND OF THE INVENTION

Tube couplers are in wide use and find great utility in connecting two pieces of tubing (usually flexible tubing) in a flow-conducting relationship. Examples of installations using such couplers include biomedical and chemistry laboratories, automatic production tools, product assembly tools and the like. Often, compressed air or other gas at relatively-low pressure, e.g., below about 100 psi, is the medium being conducted by the tubing.

Because such installations are "reconfigured" from time to time and because the couplers are re-used, couplers of the so-called "quick-disconnect" type are popular. The male and female members of quick-disconnect couplers can often be attached to and detached from one another without the use of tools or at least with only minimal use of tools.

Example of tube couplers are shown in U.S. Pat. No. 4,436,125 (Blenkush); U.S. Pat. No. 4,570,980 (Goward); U.S. Pat. No. 5,052,725 (Meyer et al.) U.S. Pat. No. 5,074,601 (Spors et al.); U.S. Pat. No. 5,152,555 (Szabo) and many others. While such couplers have been generally satisfactory, they have certain shortcomings. For example, the indicator clip used with the coupler depicted in the Szabo patent is apparently readily removed from the coupler female element. One could expect that such clip may easily become lost or misplaced.

The disengaging member of the connector shown in the Spors et al. patent is formed as a non-bifurcated elongate loop retained on the female component of such connector. Presumably, such loop cannot be easily separated from such component.

Another shortcoming of prior art tube couplers involves the way that the female and male members of such couplers are held together. Such tube couplers often have a member mounted for movement between a position holding the male and female members together and another position permitting separation of such members.

The coupling of the Blenkus patent noted above has such a member embodied as a plate which is spring-biased upward. Such plate must be manually depressed downward and held in such position while pulling the coupling male and female members apart. This requires a degree of manual dexterity—at the least, the Blenkush coupling is somewhat inconvenient to use.

Similarly, it is also required that the plate depicted in such Blenkush patent be depressed downward while pushing the male and female members together. And such plate is to be released only when such members are positioned in sealing engagement with one another. Such position is not always apparent, either visually or by tactile sensing. And if the coupling is temporarily laid aside, when the coupling is again taken up, the plate must again be depressed to the proper position before tubing can be connected or disconnected.

An improved quick-disconnect tube coupler overcoming some of the problems and shortcomings of known couplers would be an important advance in the art.

OBJECTS OF THE INVENTION

It is an object of the invention to provide an improved tube coupler overcoming some of the problems and shortcomings of known tube couplers.

Another object of the invention is to provide an improved tube coupler in which the device holding the male and female members securely together is well retained on the coupler to prevent loss of such device.

Another object of the invention is to provide an improved tube coupler requiring very little manual dexterity to use.

Still another object of the invention is to provide an improved tube coupler wherein the holding device is automatically and conveniently latched in a "tube-disconnect" position when such device is moved to such position.

Another object of the invention is to provide an improved tube coupler which may be laid aside while yet retaining the holding device in a tube-disconnect position.

Yet another object of the invention is to provide an improved tube coupler wherein the holding device is automatically released when the male and female members are urged into tight sealing engagement with one another.

Another object of the invention is to provide an improved tube coupler in which automatic release of the holding device is achieved irrespective of the relative rotational positions of the male and female members to one another. How these and other objects are accomplished will become more apparent from the following descriptions and from the drawings.

SUMMARY OF THE INVENTION

An aspect of the invention involves a bifurcated device for use in a tube coupler having male and female members. The device holds such members in sealing contact with one another. Such device is fork-like and has first and second rails for engaging the male member and holding it in position in the female member.

In the improvement, at least one rail has a laterally-outward surface and at least such rail includes a projection extending away from such surface. Most preferably, each of the first and second rails has a laterally-outward surface and a hook-like projection extending away from each such surface. Each projection has an engagement face and the surface and the face of each rail define a V-shaped notch therebetween.

In a related tube coupler, the female member includes first and second retention shoulders. The projection on each rail of the device is at the free end of its respective rail and engages a respective one of the retention shoulders when the device is in the coupling position, i.e., the position at which the male member is securely held in the female member.

To help assure that a particular projection engages its respective retention shoulder, each shoulder has a cooperating guide member spaced somewhat away from such shoulder. An opening is thereby defined between the shoulder and the guide member. Each rail extends through its respective opening between a retention shoulder and a guide member. Thus, during transverse movement of the device from the "de-coupling" position to the "coupling" position, each of the projections is guided to engagement with a respective retention shoulder.

Another aspect of the invention involves a unique locking mechanism which holds the device in its de-coupling position, i.e., that position at which the male and female members may be readily separated from one another. This feature makes it much easier to couple pieces of tubing to one another (or to couple a tube and a valve body to one another) without having to be concerned about manually holding the device in the release position.

The locking mechanism is biased toward the device so that when the device is moved to the de-coupling position, the locking mechanism engages the device and retains it in such position. Biasing is preferably by a "live" hinge having what is known as "shape memory." Such locking mechanism is oriented generally normal to the female member when the device is in the coupling position and the mechanism is in the unlatch position disengaged from such device. When the mechanism is in the latch position and engages the device, such mechanism is angularly oriented to the female member.

A specific, highly-preferred embodiment of the locking mechanism is shaped like an inverted L and has a body portion and a lip extending from such body portion. The device includes a notch and the lip is in the notch when the locking mechanism engages the device.

And not only does the coupler provide automatic retentive latching of the device in the de-coupling position, such coupler also provides for automatic release of the locking mechanism when the male and female members are pressed into sealing contact with one another. The locking mechanism comprises a first-class lever having a locking lip and a trip arm spaced from one another and a fulcrum between the lip and the arm. The coupler has a trip surface contacting the trip arm and thereby urging the mechanism to the unlatch position when the male member and the female member are moved to sealing contact with one another.

In a highly-preferred embodiment, the trip surface is on an annular trip flange molded or otherwise attached to the body of the male member. Because of the annularity of the flange, automatic unlatching of the locking mechanism and release of the device to its coupling position occurs irrespective of the relative rotational positions of the male and female members.

Other aspects of the invention are set forth in the following detailed description and in the drawings.

DETAILED DESCRIPTIONS OF PREFERRED EMBODIMENTS

Figure 1:
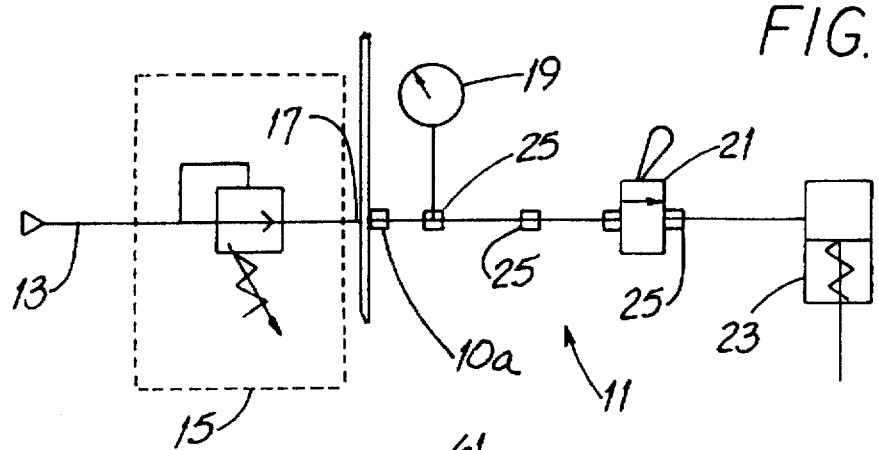
FIG. 1 is a simplified circuit diagram representing an exemplary installation of the type with which the new coupler may be used.

Before describing aspects of the inventive tube coupler 10, it will be helpful to have an understanding of one exemplary type of installation 11 in which such coupler 10 may be used. FIG. 1 shows an air inlet line 13 feeding a pressure regulating valve 15. (An ideal valve 15 is shown in U.S. Pat. No. 5,217,260 (Boticki).

The output line 17 of the valve 15 is connected through a panel-mounted tube coupler 10a to a gauge 19, to a manually-operated control valve 21 and to a pneumatic cylinder 23. Operating the valve 21 positions the cylinder 23 to perform useful work. The new coupler 10 may be used at any one, some or all of the exemplary locations identified by 25.

Figure 2A:
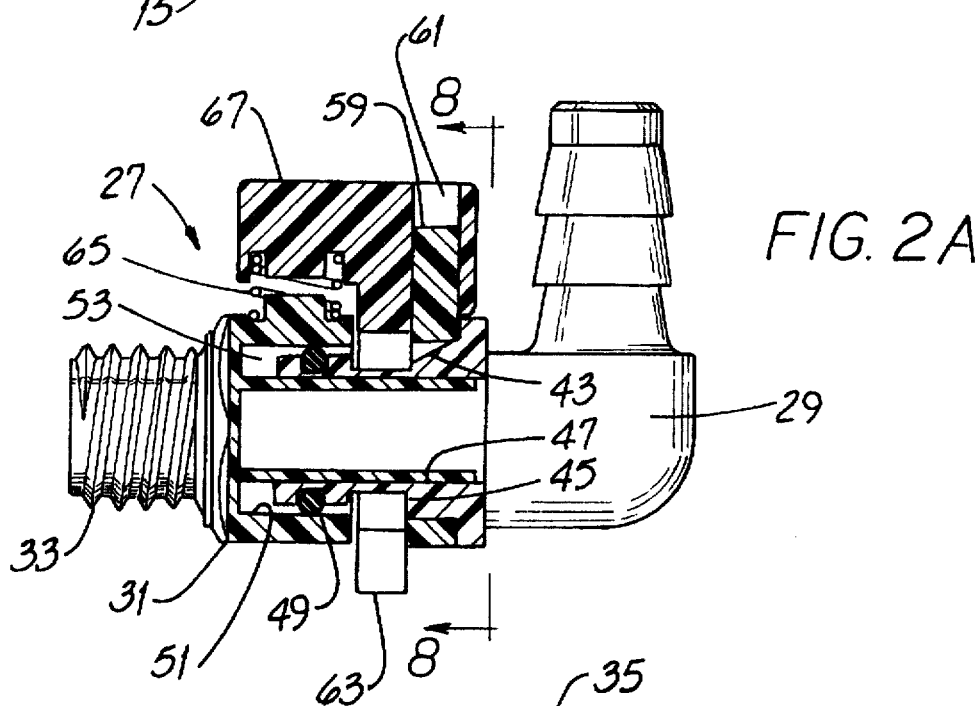
FIG. 2A is a side elevation view, partly in section, of one embodiment of the new coupler.
Figure 2B:
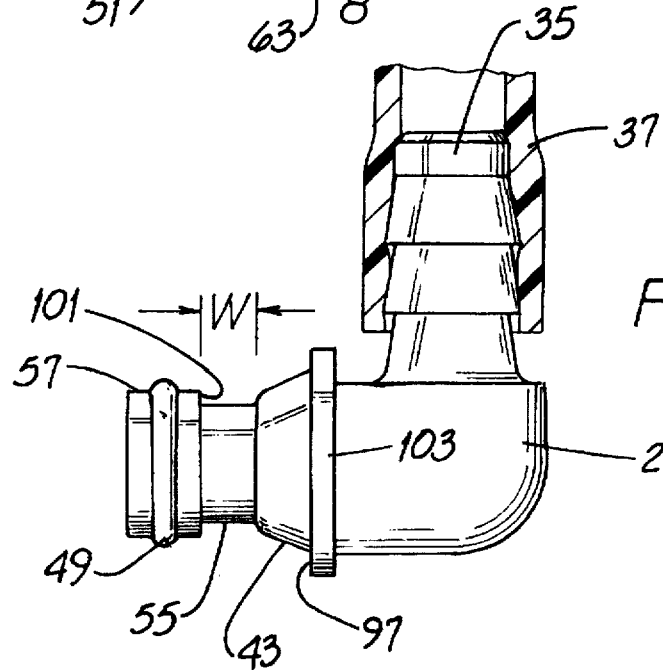
FIG. 2B is a side elevation view, partly in section, of the male member of the coupler shown in FIG. 2A. A piece of tubing is attached to such male member.
Figure 2C:
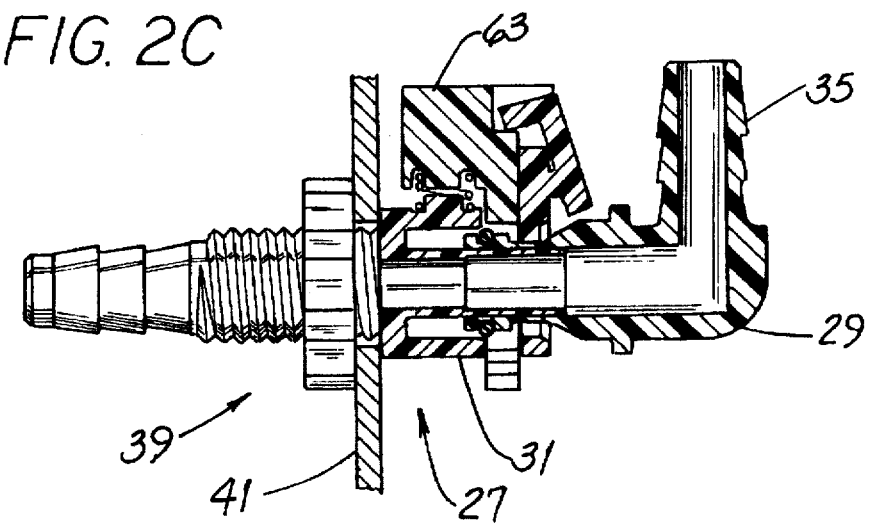
FIG. 2C is a side elevation view, partly in section, of another embodiment of the new coupler including a locking mechanism. The coupler has an end suitable for panel mounting.
Figure 3:
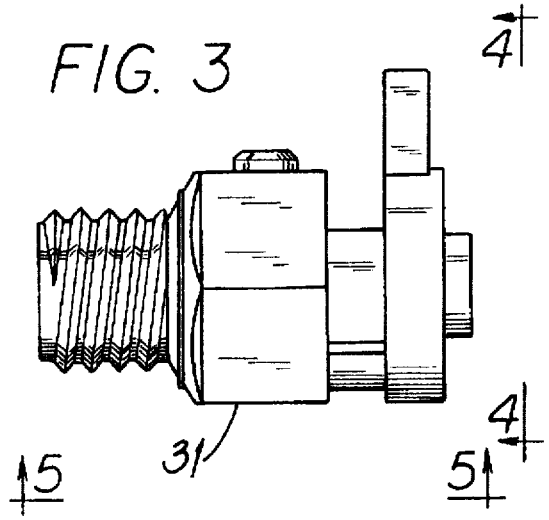
FIG. 3 is a side elevation view of the female member of the new coupler.

Referring also to FIGS. 2A, 2B and 2C, the new tube coupler 10 includes a female member 27 and a male member 29. The body 31 of the female member 27 has a threaded end 33 for attachment to a valve body while the male member 29 has a barbed end 35 for direct attachment to a length of flexible tubing 37. It should be appreciated, however, that threaded ends 33, barbed ends 35 and ends 39 permitting mounting on and through a sheet metal panel 41 can be used with the members 27, 29.

In FIG. 2A, the male member 29 is "seated" in the female member 27 at a position such that the tapered face 43 of the male member 29 is against the body 31 of the female member 24, the end 45 of such member 29 is telescoped over the tube portion 47 of the body 31 and the O-ring seal 49 on the male member 29 is against the seal wall 51 in the female member 27. (The annular cavity 53 bounded by the seal wall 51 is not in flow communication with the tube portion 47. Therefore, sealing against the wall 51 effectively prevents internal leaks in the coupler 10.) FIG. 2B shows the annular groove 55 between the seal support 57 boss and the tapered face 43 of the male member 29.

As shown in FIG. 2A, the body 31 includes a guide post 59 extending transversely therefrom. The post 59 extends into a conformably-shaped opening 61 in the device 63 for guiding the transverse movement of the fork-like device 63 used to hold the male and female members 29, 27 together. In the view of FIG. 2A, the device 63 is shaped somewhat like an inverted, reversed L and is biased upwardly by a compression spring 65 interposed between the device head 67 and the body 31.

Figure 4:
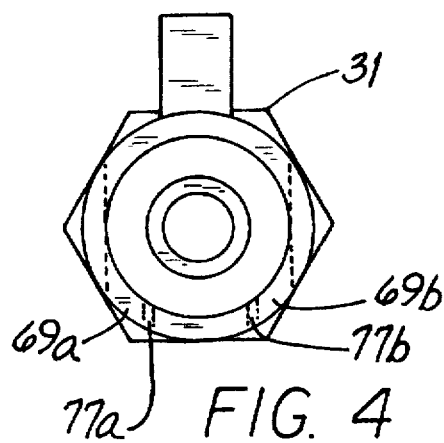
FIG. 4 is an end elevation view of the female member taken along the viewing plane 4—4 of FIG. 3. Surfaces of parts are shown in dashed outline.
Figure 5:
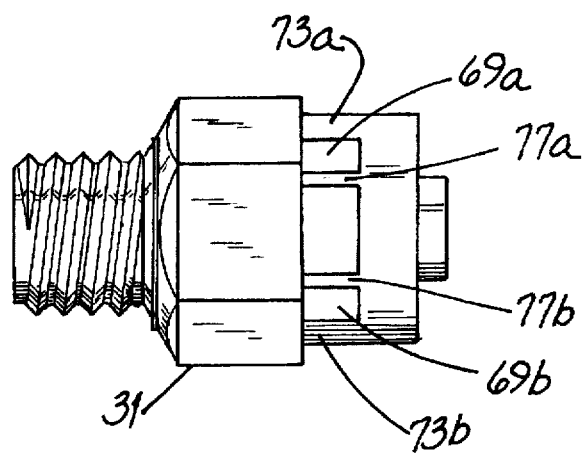
FIG. 5 is a bottom plan view of the female member taken along the viewing plane 5—5 of FIG. 3.

Referring also to FIGS. 3 through 9, other aspects of the body 31 of the female member 27 will now be described. Such body 31 includes a pair of transverse apertures 69a, 69b through which extend the respective rails 71a, 71b of the holding device 63 shown in FIGS. 6 and 7. In the view of FIG. 5 and with the device 63 removed from the body 31, a viewer is able to see entirely through such apertures 69a, 69b.

The body 31 also has a retention shoulder 73a, 73b immediately adjacent to each aperture 69a and 69b, respectively. When the device 63 is mounted on the body 31 and is spring-biased upward to the coupling position shown in FIG. 9, each of the outward projections 75a, 75b of the device rails 71a, 71b engages a respective shoulder 73a, 73b. Such projection-shoulder engagement retains the device 63 in the body and prevents its loss.

Figure 8:
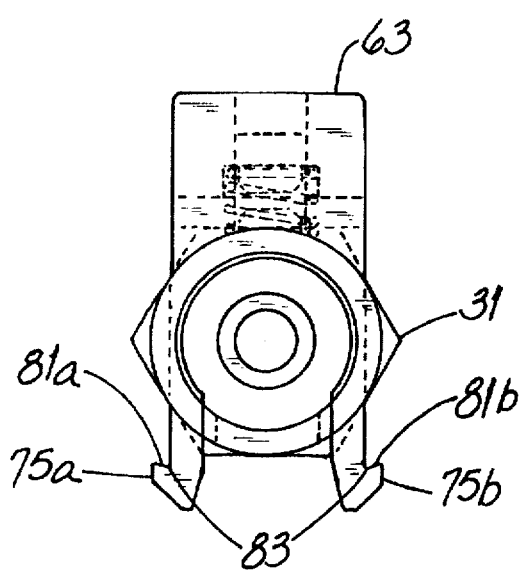
FIG. 8 is an end elevation view of the female member of the new coupler taken generally along the viewing plane 8—8 of FIG. 2A and showing the holding device of FIG. 7 in its depressed, de-coupling position.
Figure 9:
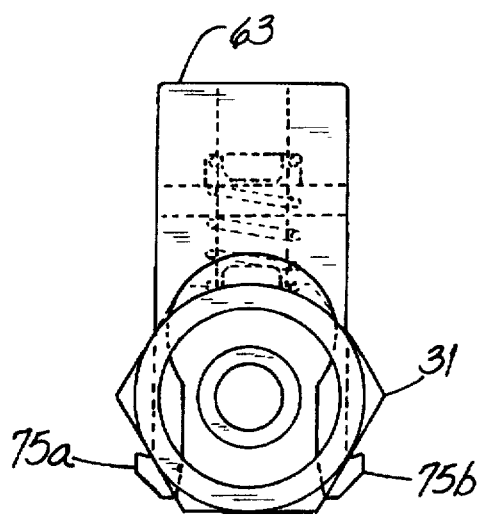
FIG. 9 is an end elevation view of the female member of the new coupler taken generally along the viewing plane 8—8 of FIG. 2A and showing the holding device of FIG. 7 in its raised, coupling position.

Referring particularly to FIGS. 4, 5 and 9, the body 31 also has two guide members 77a and 77b, one defining (in part) each of the openings or apertures 69a and 69b, respectively. During upward movement of the device 63 (from the position shown in FIG. 8 to that shown in FIG. 9), each guide member 77a, 77b prevents its associated rail 71a and 71b, respectively, from unduly moving radially inwardly. To put it in other words, the guide members 77a, 77b function to guide the projections 75a, 75b to engagement with a respective retention shoulder 73a, 73b.

Figure 6:
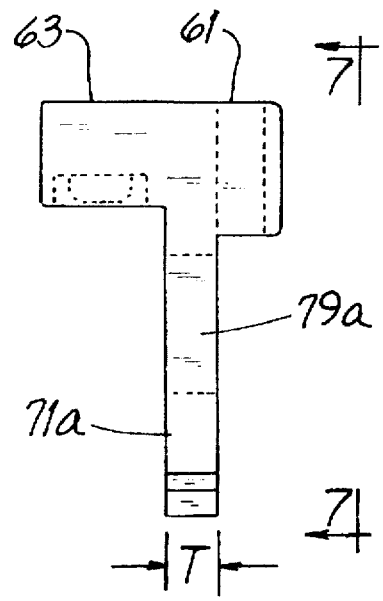
FIG. 6 is a side elevation view of the holding device of the new coupler.
Figure 7:
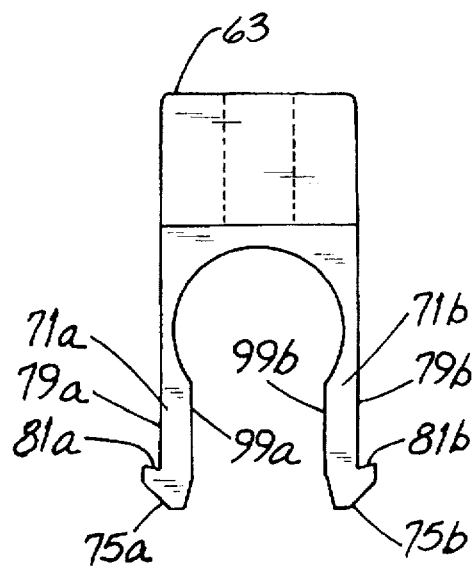
FIG. 7 is an end elevation view of the holding device of FIG. 6 taken along the viewing plane 7—7 thereof.

Referring particularly to FIGS. 6 and 7, further aspects of the unique device 63 will now be described. Each rail 71a, 71b of such device (which is fork-like) has a laterally-outward surface 79a, 79b, respectively. A hook-like projection 75a, 75b extends away from such surface 79a and 79b, respectively. Each projection 75a, 75b has an engagement face 81a, 81b, respectively (a face which engages a shoulder 73 of the body 31) and the surface 79 and the face 81 of each rail 71 define a V-shaped notch 83 therebetween. In a highly preferred arrangement, each of the rails 71 is attached at only one end and is free at the other end. Thus, each rail 71 may be moved slightly later be moved slightly laterally (left or right as viewed in FIG. 7) and/or longitudinally (into or out of the drawing sheet as viewed in FIG. 7) independently of the other rail 71.

Figure 10:
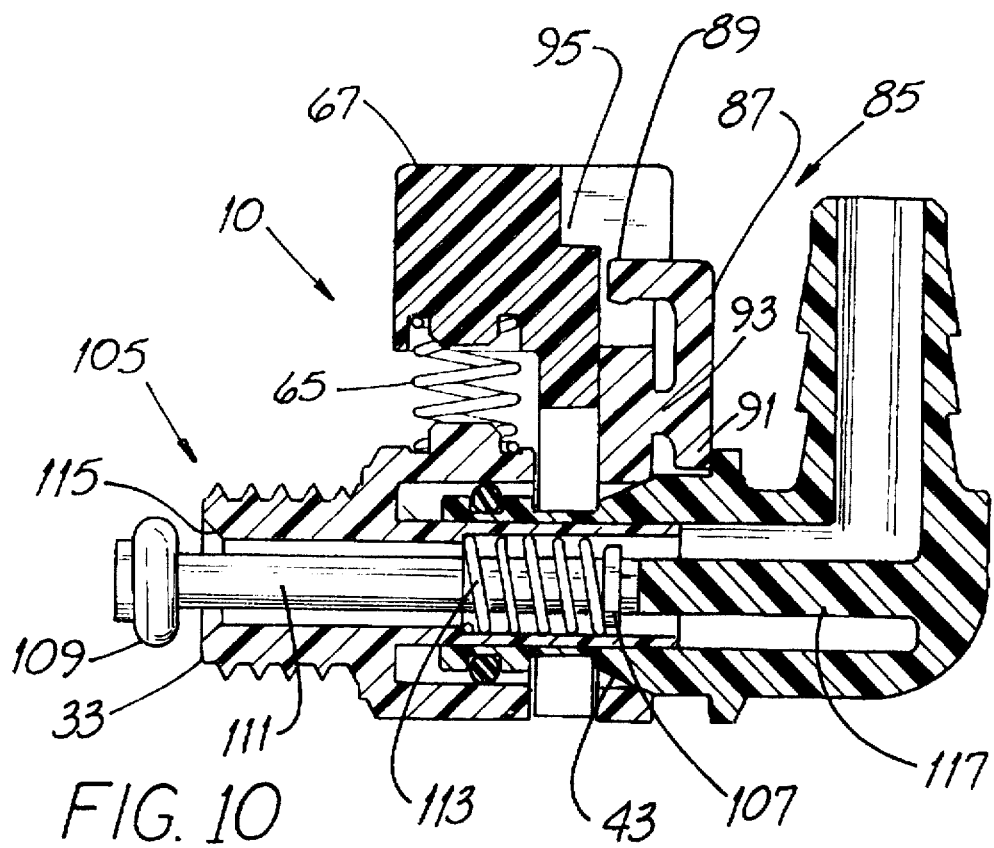
FIG. 10 is a side elevation view, partly in section, of yet another embodiment of the new coupler including an optional shutoff valve. Such valve is shown in the open position and the locking mechanism is shown in the unlatched position.
Figure 11:
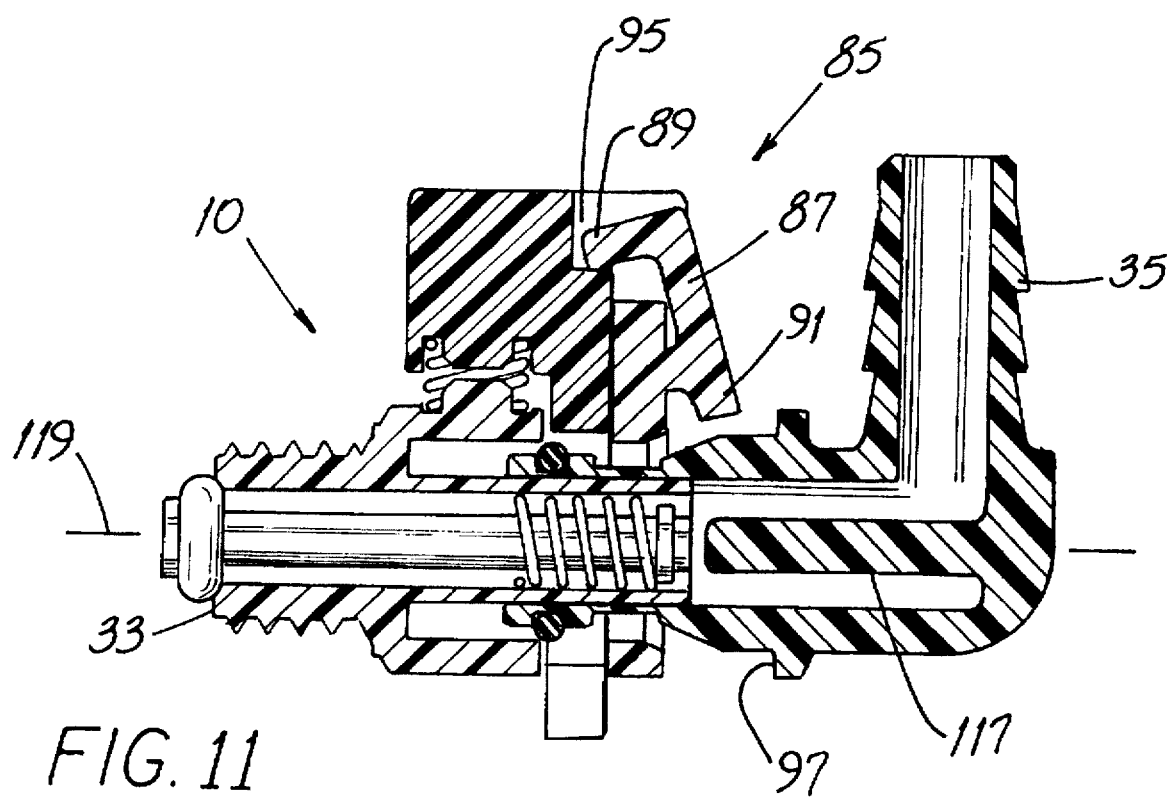
FIG. 11 is a side elevation view generally like that of FIG. 10 and showing the shutoff valve in the closed position and the locking mechanism in the latched position.

Referring next to FIGS. 8, 10 and 11, another aspect of the inventive coupler 10 involves a unique locking mechanism 85 which holds the device 63 in the de-coupling position shown in FIG. 8 and 11. A highly-preferred embodiment of the locking mechanism 85 is shaped like an inverted L (reversed in the views of FIGS. 10 and 11) and has a body portion 87, a locking lip 89 extending from such body portion 87 and a trip arm 91 spaced from the lip 89.

A fulcrum 93 is between the lip 89 and the arm 91 and the body 87 and the relative positions of the fulcrum 93, lip 89 and arm 91 form what is known as a first class lever. The head 67 of the device 63 includes a notch 95 and as shown in FIG. 11, the lip 89 is in the notch 95 when the locking mechanism engages the device 63.

Preferably, the fulcrum 93 is a "live" hinge having what is known as "shape memory." The characteristic of shape memory biases the lip 89 toward the device 63, i.e., biases the body portion 87 counterclockwise in FIGS. 10 and 11. When the device 63 is depressed to the de-coupling position (permitting separation of the male and female members 29, 27), the lip 89 automatically engages the device 63 and retains it in such de-coupling position.

To explain shape memory in another way, when the body portion 87 is urged away from its angled repose position shown in FIG. 11 to the upright position shown in FIG. 10, the fulcrum 93 "remembers" the repose position. When the urging force is removed, the fulcrum 93 returns the body portion 87 to its angled repose position. A material suitable for molding the body portion 87 and the fulcrum 93 is acetal.

The features which provide for automatic release of the locking mechanism 85 when the male and female members 29, 27 are fully connected together will now be described. Referring further to FIGS. 10 and 11, the coupler 10 has a trip surface 97 contacting the trip arm 91 when such members 29, 27 are so connected. The body portion 87 is thereby moved to the unlatch position, i.e., is pivoted clockwise to move the lip 89 out of the notch 95. No longer restrained by the lip 89, the device 63 moves upwardly under the urging of the spring 65.

Referring to FIGS. 2B, 6, 7 and 9, when the device 63 moves upwardly, its retention ledges 99a, 99b come into registry with the groove 55 in the male member 29. The longitudinal width W of the groove 55 is only slightly greater than the thickness T of the rails 71 and when the male member 29 is fully seated, the rails 71 contact or substantially contact the edge 101 of the support boss 57. Thus, the male and female members are prevented from separating from one another.

In a highly-preferred embodiment, the trip surface 97 is on an annular trip flange 103 molded or otherwise attached to the male member 29. In that way, automatic unlatching of the locking mechanism 85 and release of the device 63 to its coupling position of FIGS. 9 and 10 occurs irrespective of the relative rotational positions of the male and female members 29, 27.

From the foregoing, several facts are now apparent. One is that when the male and female members 29, 27 are separated from one another, the user may lay the female member 27 aside to attend to other tasks. The device 63 will nevertheless be automatically held in its de-coupling position ready for instant use. And when the members 27, 29 are attached to pieces of tubing 37, they may then be assembled as shown in FIG. 11.

The user may be assured that the device 63 will be automatically released only when the members 27, 29 are in the proper positional relationship. Essentially no thought need be given to manipulation of the device 63 during disconnection, connection or otherwise.

And using a bifurcated device 63 aids assembly during manufacture. The device rails 71 may be inserted through the apertures 69 until the projections 75 engage the shoulders 73. Engagement is substantially assured by the guiding forces provided by the guide members 77. And since the rails 71 are cantilever rails attached at only one end, each rail 71 is free to bend slightly (and independently of the other rail 71) to accommodate slight disparities in the longitudinal position or lateral spacing of the apertures 69.

Referring further to FIGS. 10 and 11, the new coupler 10 may include an optional shutoff valve 105. Such valve 105 includes a valve head 107, a seal 109 and a stem 111 extending between the head 107 and the seal 109. In the absence of an external force, a compression spring 113 urges the seal 109 against the surface 115 and prevents flow along the tube portion 47.

The male member 29 includes a post-like actuating rod 117 which, like the portion 47, the seal 109, the head 107 and the stem 111, is concentric with the long axis 119 of the coupler 10. When the male and female members 29, 27 are fully engaged with one another as shown in FIG. 10, the rod 117 moves the stem 111, seal 109 and head 107 in a direction to space the seal 109 from the surface 115. The tube portion 47 is thereby free to conduct flow therethrough.

An advantage of the optional shutoff valve 105 is that pressurized fluid flowing into the end 33 of the female member 27 is prevented from escaping when the members 29, 27 are disconnected from one another.

While the principles of the invention have been shown and described in connection with a few preferred embodiments, it is to be understood clearly that such embodiments are by way of example and are not limiting.

What is claimed:

1. In a tube coupler having a female member, a male member received in the female member and a device for holding the male and female members in sealing contact with one another, the improvement wherein:

the female member includes a tube portion, first and second retention shoulders and first and second guide members;

the device includes first and second rails, each rail having an outward surface, an inward surface and a free end;

each rail has a projection extending from the rail outward surface and engaging a respective one of the retention shoulders;

each guide member is spaced from a respective retention shoulder and bears against the inward surface of a respective rail, thereby preventing the rail from unduly moving away from a respective retention shoulder;

the device is mounted at the tube portion of the female member for transverse movement between a holding position and a release position;

the coupler includes a locking mechanism mounted on the female member adjacent to the device and having a body portion biased toward the device and bearing against the device when the device is moved to the release position, thereby retaining the device in the release position.

2. The tube coupler of claim 1 wherein:

each retention shoulder and its respective guide member have an aperture therebetween; and each rail extends through a respective aperture.

3. The tube coupler of claim 1 wherein the locking mechanism is angularly oriented when the mechanism bears against the device.

4. The tube coupler of claim 1 wherein:

the body portion comprises a lever spaced from the female member and having a lever end and a lip extending from the lever end;

the device includes a notch at the free end of at least one rail; and the lip is in the notch and bears against the device for retaining the device in the release position.

5. In a tube coupler having a female member, a male member received in the female member and a device for holding the male member and the female member in sealing contact with one another, the improvement wherein:

the device is mounted on the female member for movement between a holding position and a release position;

the female member includes a tube portion, and the coupler includes:

a locking mechanism mounted on the female member adjacent to the tube portion and having a lever mounted for movement with respect to the female member, the movement being between a latch position and an unlatch position, the lever bearing against the device when the device is in the release position and when the lever is in the latch position;

a trip surface on the male member and bearing against the lever and thereby pivoting the lever to the unlatch position when the male member and the female member are moved to sealing contact with one another.

6. The tube coupler of claim 5 wherein:

the lever has a body portion with two ends, a locking lip extending from one end and a trip arm at the other end; and the trip surface contacts the trip arm when the male member and the female member are moved to sealing contact with one another.

7. The tube coupler of claim 6 wherein:

the mechanism includes a fulcrum between the lip and the arm, whereby the lever is a first class lever.

8. In a tube coupler having a female member, a male member received in the female member and a device for holding the male and female members in sealing contact with one another, the improvement wherein:

the female member includes first and second retention shoulders;

the device includes first and second rails, each having a free end; and each rail has an outward projection engaging one of the retention shoulders;

the device is mounted on the female member for transverse movement between a holding position and a release position;

the female member includes a body and a tube portion extending from the body;

the coupler includes a locking mechanism adjacent to the tube portion, the mechanism having a body portion biased toward the device; and when the device is moved to the release position, the body portion bears against the device for position retention.

9. The tube coupler of claim 8 wherein the body portion is angularly oriented when the portion bears against the device.

10. The tube coupler of claim 8 wherein:

the body portion includes a lip;

the device includes a head having a notch formed therein; and the lip is in the notch when the body portion bears against the device.

* * * * *